(12) United States Patent
Teichmann et al.

(10) Patent No.: US 7,394,166 B2
(45) Date of Patent: Jul. 1, 2008

(54) METHOD, APPARATUS AND COMPUTER PROGRAM PRODUCT FOR WIND TURBINE START-UP AND OPERATION WITHOUT GRID POWER

(75) Inventors: Ralph Teichmann, Albany, NY (US); Lei Li, Shanghai (CN); Changyong Wang, Shanghai (CN); Wenqiang Yang, Shanghai (CN)

(73) Assignee: General Electric Company, Niskayuna, NY (US)

( * ) Notice: Subject to any disclaimer, the term of this patent is extended or adjusted under 35 U.S.C. 154(b) by 127 days.

(21) Appl. No.: 11/538,618

(22) Filed: Oct. 4, 2006

(65) Prior Publication Data

US 2008/0084070 A1  Apr. 10, 2008

(51) Int. Cl.
*H02P 9/48* (2006.01)
(52) U.S. Cl. ............................ 290/44; 290/55; 322/37
(58) Field of Classification Search ............... 290/30 R, 290/38 R, 44, 55; 322/22, 37
See application file for complete search history.

(56) References Cited

U.S. PATENT DOCUMENTS 4,446,376 A  5/1984  Baker
6,838,781 B2 * 1/2005 van de Loo ............... 290/40 B
7,015,595 B2 * 3/2006 Feddersen et al. ............. 290/44
7,126,236 B2 * 10/2006 Harbourt et al. .............. 290/44
7,141,887 B2 * 11/2006 Okubo et al. ................. 290/44
7,233,129 B2 * 6/2007 Erdman et al. ................ 322/17
2006/0125241 A1 6/2006 DuHamel
2006/0163882 A1 7/2006 Brandt

OTHER PUBLICATIONS

JP62058061. Publication Date: Mar. 13, 1987. "Wind Power Generating Device". (Abstract Only).

* cited by examiner

*Primary Examiner*—Nicholas Ponomarenko
(74) *Attorney, Agent, or Firm*—Ann M. Agosti; Patrick K. Patnode

(57) ABSTRACT

A wind turbine having features for black-starting includes an electric generation system for producing electricity by operation of the wind and comprising an interface for providing the electricity to an electric grid; a control system for controlling components of the wind turbine during start-up of the electric generation system, wherein start-up occurs during a deficient electric signal of the grid; and at least one energy providing element and at least one energy dissipative element for providing a balance between an output of the wind turbine and the electric signal of the grid. Methods and computer program products for operation of the wind turbine call for, among other things, synchronization of electric signals and control of components within the wind turbine.

19 Claims, 8 Drawing Sheets

METHOD, APPARATUS AND COMPUTER PROGRAM PRODUCT FOR WIND TURBINE START-UP AND OPERATION WITHOUT GRID POWER

BACKGROUND OF INVENTION

1. Field of the Invention

The present invention relates to connection of electrical generation equipment to an electrical grid, and in particular, the invention relates to connecting a wind turbine to an electrical grid as a part of a start-up procedure.

2. Description of the Related Art

The stability of electrical distribution grids is of increasing interest. For example, with ongoing de-regulation of electrical power generation and with an increasing share of electrical power generating equipment using renewable sources (such as wind), stability margins in the grid have become increasingly smaller. The reduced margin has led to more frequent grid outages. At least two issues are of considerable interest when considering aspects of grid start-up and making electrical connections.

First, recovery from grid outages requires at least one and perhaps several generating units to be started without the presence of a grid signal (i.e., an active grid). This requirement for "black starting" is imposed upon many types of generators, including wind turbines. Consider that with the increased use of wind turbines as well as increased power output, wind turbines are greater source of electrical power than ever before. Therefore, one skilled in the art will recognize that wind turbines with black start capabilities could be strategically located inside grid segments that are subject to an outage. The black start capable wind turbines may then be relied upon for energizing each grid segment.

In this scenario, it may be considered that each wind turbine would then form an "island" within a larger grid. Island grid operation may be temporary, as during the recovery from a larger grid outage, or permanent as in the case of autonomous grids. Unfortunately, black start capability is a new feature for wind turbines. No solutions or products are known to the inventors of the teachings herein.

Further, many wind turbines are coupled to electric grids by use of long cables. The long cables usually have a large electrical capacitance. Connection of wind turbines having long cables can lead to instantaneous transfer of undesirably high charge currents as well as transient over voltages, particularly if the wind turbine is connected at full voltage.

What are needed are techniques for controlled and safe start-up of wind turbines. Preferably, the techniques provide for energizing connections having large capacitance (as in the case of long cables), as well initiation of grid operation.

BRIEF DESCRIPTION OF THE INVENTION

Disclosed is a wind turbine including: an electric generation system for producing electricity by operation of the wind and including an interface for providing the electricity to an electric grid; a control system for controlling components of the wind turbine during start-up of the electric generation system, wherein start-up occurs during a deficient electric signal of the grid; and at least one energy providing element and at least one energy dissipative element for providing a balance between an output of the wind turbine and the electric signal of the grid during the start-up.

Also disclosed is method for start-up of an electrical generation system of a wind turbine, the method including: monitoring a signal of an electrical grid, the grid for distribution of an electric output signal from the generation system, and starting the electrical generation system by at least one of supplying power to components of the wind turbine and dissipating power from the grid by controlling at least one of a start-up power supply of the turbine and an energy dissipative element of the turbine.

Further disclosed is a computer program product stored on machine readable media including instructions for start-up of an electrical generation system of a wind turbine, the instructions for: monitoring a signal of an electrical grid, the grid for distribution of an electric output signal from the generation system, and starting the electrical generation system by at least one of supplying power to components of the wind turbine and dissipating power from the grid by controlling at least one of a start-up power supply of the turbine and an energy dissipative element of the turbine.

BRIEF DESCRIPTION OF THE DRAWINGS

Referring now to the drawings wherein like elements are numbered alike in the several figures, wherein.

DETAILED DESCRIPTION OF THE INVENTION

The system architecture according to the teachings herein provide for black starting of a wind turbine. That is, start-up and operation of all systems in the wind turbine without the presence of a grid voltage. Typically, the grid voltage has been required for enabling the wind turbine to inject electrical power into the grid. Black-start capability is essential for recovery from major grid disturbances, for the operation of autonomous grids, and to charge long cables leading to off-shore wind installations. The system architecture disclosed herein provides for the black-start of multiple turbines.

As used herein, "black-start" and other similar terms make reference to starting the turbine in the absence of an electrical signal in an electrical grid. The "absence" of the electrical signal refers to the absence of an electrical signal that meets design specifications for normal operation of the electrical grid. Accordingly, "absence" may include a complete absence of electrical signal up to and including only a minor loss of electrical signal in the grid (i.e., in the presence of a deficient electrical signal). Stated another way, it is recognized that black-starting may be initiated in a variety of conditions and continue until a normal operational signal is present in the grid. For example, the teachings herein accommodate maintaining operation during low voltage periods of the grid, referred to as "low voltage ride through."

Figure 1:
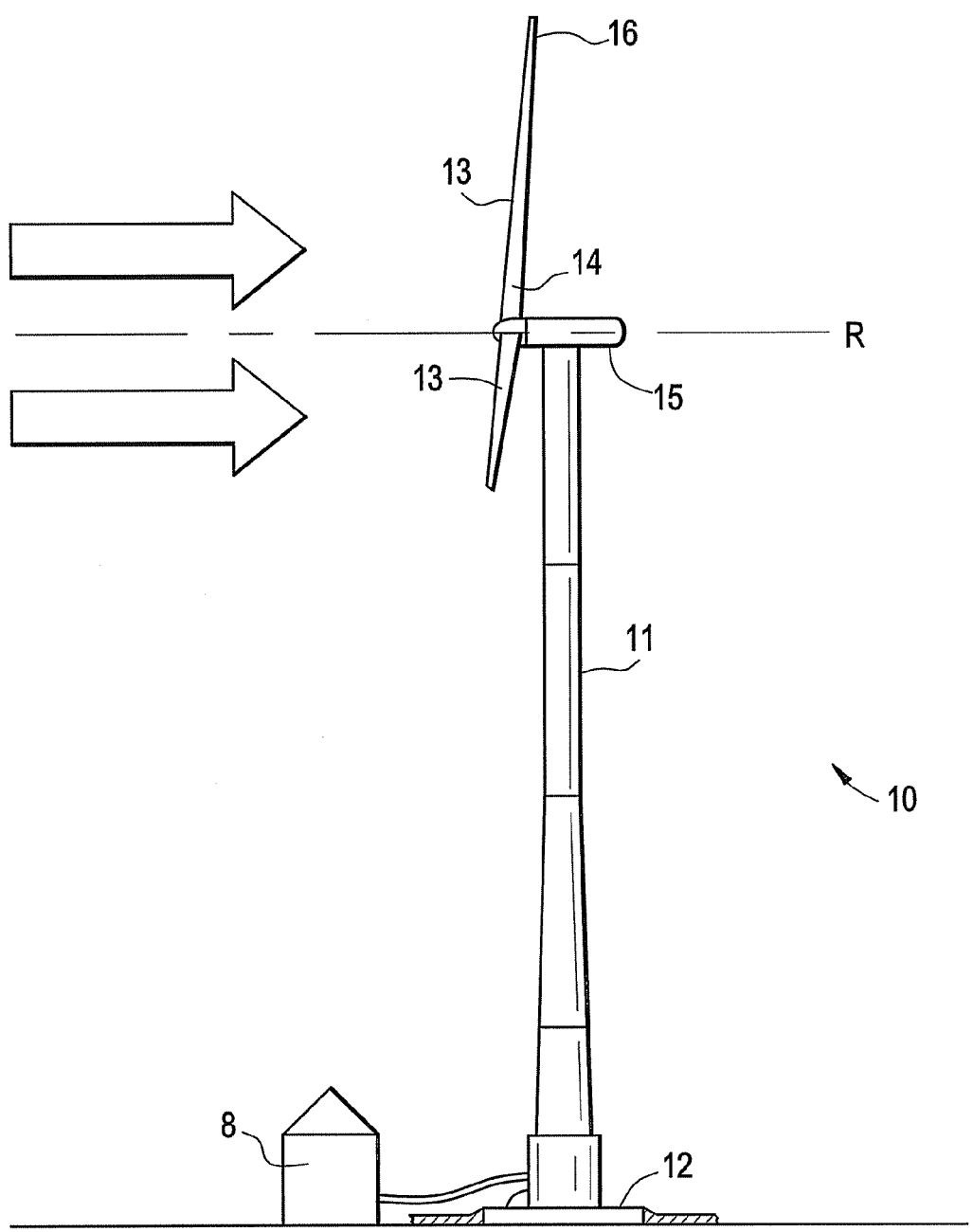
FIG. 1 illustrates aspects of a wind driven turbine.

Referring to FIG. 1, there is shown an exemplary wind driven turbine 10. In this embodiment, the turbine 10 includes a tower 11 having a base 12 for securing the turbine 10 to the terrain. At least one to many rotor blades 13, each one having a root 14 and a tip 16, are coupled to a nacelle 15 that is in turn coupled to the tower 11. During operation, wind (illustrated by the arrows pointing from left to right) impinges upon the rotor blades 13 causing rotation of the rotor blades 13 about an axis of rotation R. In the non-limiting examples discussed herein, the mechanical energy generated by the rotation of the rotor blades 13 is converted by systems within the nacelle 15 to produce electrical output.

Figure 2:
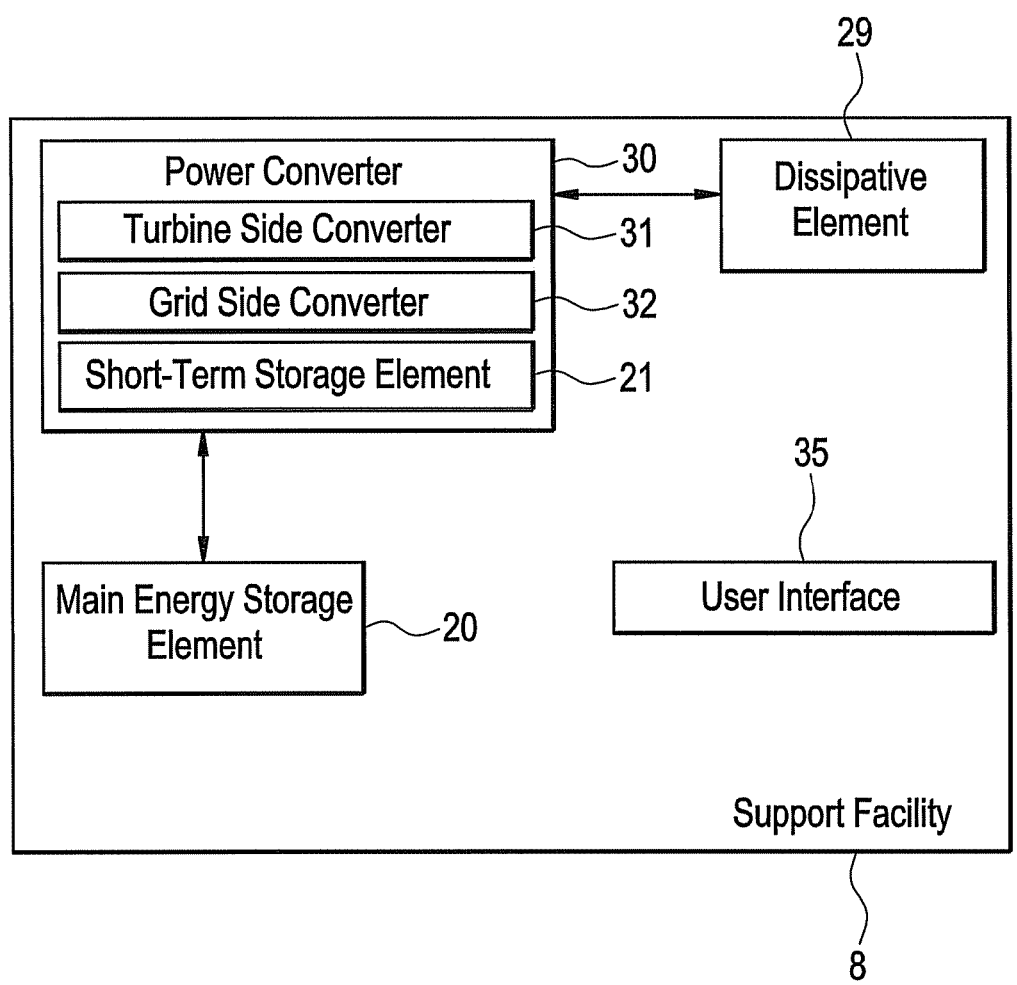
FIG. 2 depicts components within a support facility for the wind turbine.

Also depicted in FIG. 1 is a support facility 8. The support facility 8 includes additional resources as needed and for purposes herein, is considered to be a part of the wind turbine 10. For example, in some embodiments, the support facility 8 includes various power converters, energy storage units, user interfaces and other such equipment. Reference may be had to FIG. 2.

In FIG. 2, the support facility 8 includes a main power converter 30. In this embodiment, the power converter 30 includes a turbine side converter 31 and a grid side converter 32. The power converter 30 provides for conversion of power produced by a generator of the wind turbine 10 to power that is synchronized with power of the electrical grid. Aspects regarding additional elements of the support facility 8, such as a short-term energy storage element 21, a main energy storage element 20 and a dissipative element 29 are presented later herein. A user interface 35 (e.g., a local control panel or a control room) may be included in the support facility 8 to provide for aspects such as operator control over the wind turbine 10 and manual entry of commands.

Exemplary energy storage elements 20, 21 include various forms of batteries. Other devices may be used as well. For example, a diesel generator may be used to provide energy to the turbine 10 when called upon. In typical embodiments, a power supply such as a diesel generator may include automatic start features and similar controls to provide for instantaneous or substantially instantaneous delivery of power to the turbine 10. At least one capacitor may be used. Typically, the short term energy storage element 21 provides up to about several kilowatts.

The disclosure provided herein discusses supplying power to the wind turbine 10 by use of energy storage elements 20, 21. However, given the variety of devices that may provide energy to the wind turbine 10, it is considered that the term "energy providing element" may be more descriptive for some embodiments. Accordingly, the energy storage elements 20, 21 and energy providing elements are, at least in some instances, synonymous. Therefore, the term "energy storage element" is merely illustrative of some embodiments for energy providing elements and non-limiting thereof.

The dissipative element 29 may include a variety of devices. For example, in one embodiment, the dissipative element 29 is a resistor (such as a dump load resistor). In other embodiments, the dissipative element 29 includes equipment (such as a pump) to provide for occasional consumption of excess power. More specifically, in this embodiment, when the dissipative element 29 is called upon the pump may operate to hoist water from a low point to a high point. This embodiment provides some further advantages in that a portion of the hoisting energy may later be recovered by use of a water driven turbine. In some embodiments, the dissipatitive element 29 includes capacity for dissipating up to full output of the generator 23.

Figure 3:
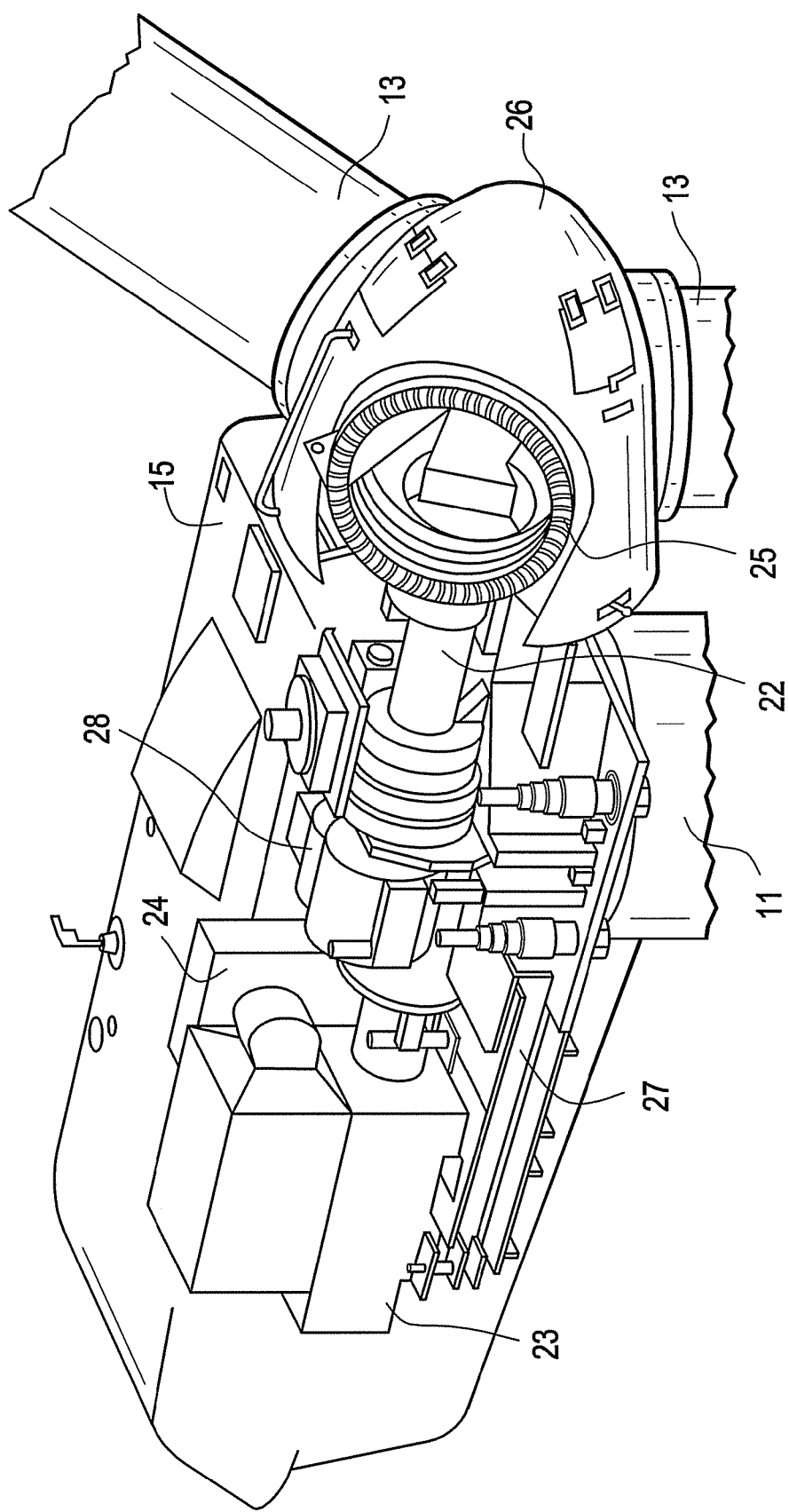
FIG. 3 is a cutaway view of a nacelle of the turbine.

FIG. 3 is a cutaway view of an exemplary nacelle 15 illustrating selected components therein. Shown in FIG. 3 are rotor blades 13 each of which are coupled at the root thereof to a rotor hub 25. A nose cone 26 provides streamlining for the hub 25 and other components. The rotor hub 25 is coupled within the nacelle 15 to a main shaft 22 that drives a gearbox 28 and, in turn, a generator 23. The generator 23 provides a supply of electricity to service an electrical grid. The grid includes distribution systems as are known in the art and is generally not discussed in greater detail herein.

Aspects of the operation of the turbine 10 are managed through a control system 24. In this embodiment, the foregoing components and various other components are coupled to a main frame 27 within the nacelle 15. It should be noted that some of the various other components depicted in FIG. 3 are considered incidental to the teachings herein. Accordingly, these and other components are generally not introduced or discussed further herein. Further components, some of which are presented herein, are included in the wind turbine 10 and may reside within the nacelle.

The wind turbine 10 according to the present teachings is designed such that at least the control system 24 can be operated as a self-sustaining unit. For example, the turbine 10 includes at least one form of the main energy storage element 20 (e.g. at least one of a battery and a capacitor) the main energy storage element 20 enabling basic control functions at any given time (such as during periods when the turbine 10 is not operational and not coupled to the electrical grid). For example, the control system 24 is designed such that fundamental actuators for controlling aspects such as yaw, pitch, braking and rotor heating can be initially actuated by relying upon energy in the main energy storage element 20. In typical embodiments, the main energy storage element 20 is replenished as soon as power is captured from the wind.

As used herein, the various components of the wind turbine 10 that require electrical input are collectively and generally referred to as a "load" and also as an "internal load." The load includes power consuming devices that are one of a part of the wind turbine 10 and associated therewith. The load may be distinguished from the electrical grid. That is, for purposes herein, the electrical grid is generally coupled to power consuming devices that are not a part of the wind turbine 10 or associated therewith.

The wind turbine 10 according to the teachings herein also features a short-term energy storage element 21 integrated into the power converter 30. The short term storage element 21 is provided for transient support. The dissipative element 29 is used to provide a power balance between wind power and load power requirements by dissipating excess energy that cannot be stored in the short-term storage element 21 of the power converter 30 (or the main energy storage element 20).

In some embodiments, the control system 24 provides for control of an idle power state by regulating the wind turbine 10 such that enough wind power is captured to maintain a balance of power while minimizing the power dissipation in the dissipative element 29. In some other embodiments, gradual increase of output voltage from the power converter 30 to the grid occurs according to a pre-determined rate. The control system 24 is enabled to provide control of a phase angle for the voltage signals supplied by the power converter 30. With the various capabilities of the control system 24, if the turbine 10 is energizing or re-energizing long cables, an excessive charge current can be avoided.

A common bus connecting all critical loads is included within the turbine 10 according to the teachings herein. In typical embodiments, the bus is designed for a wide voltage range operation (similar to automotive buses). The bus design allows for start-up using partially discharged energy storage elements 20, 21, as well as start-up or operation when voltage in the grid is below rated voltage. When multiple turbines 10 are arranged such that the turbines 10 are (in electrical terms) a part of a group, only one turbine 10 needs to be black-start enabled. The remaining turbines 10 in the group can be started sequentially, once the black-start enabled turbine 10 is running.

Figure 4:
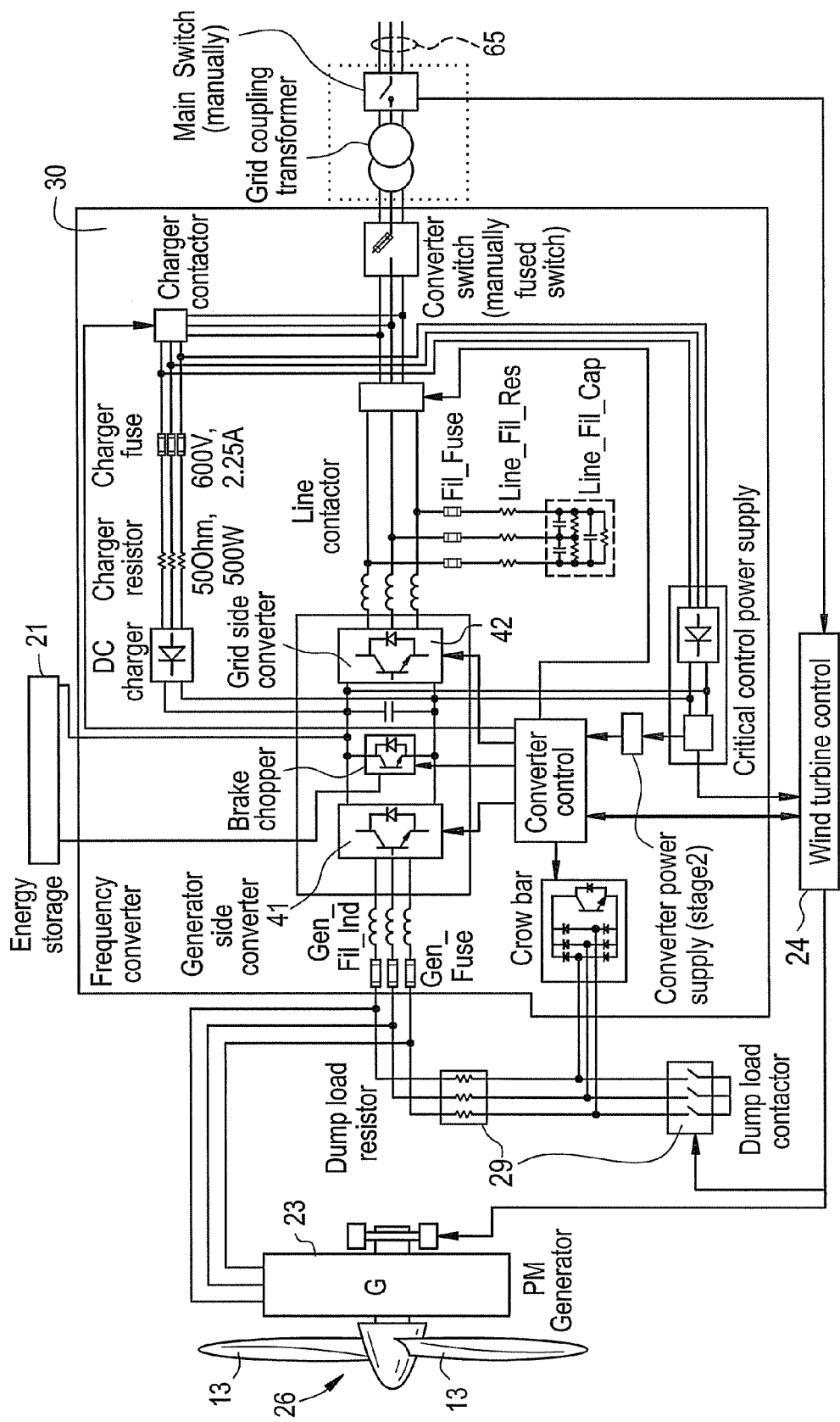
FIG. 4 provides an overview of a control system employing energy storage.

In FIG. 4, aspects of the wind turbine 10 are depicted. In FIG. 4, the power converter 30 includes various components, as may be known in the art. In this embodiment, the main energy storage element 20 and the short-term storage element 21 are coupled between a generator side converter 41 and a grid side converter 42. Typically, the dump load resistor provides energy dissipation for balancing between power between the generator 23 and the load. The power supply depicted in FIG. 4 provides for feeding power to critical loads such as the turbine control 24, sensors, micro-controllers of power converter etc. An exemplary diagram involving the power supply is provided in FIG. 5.

Figure 5:
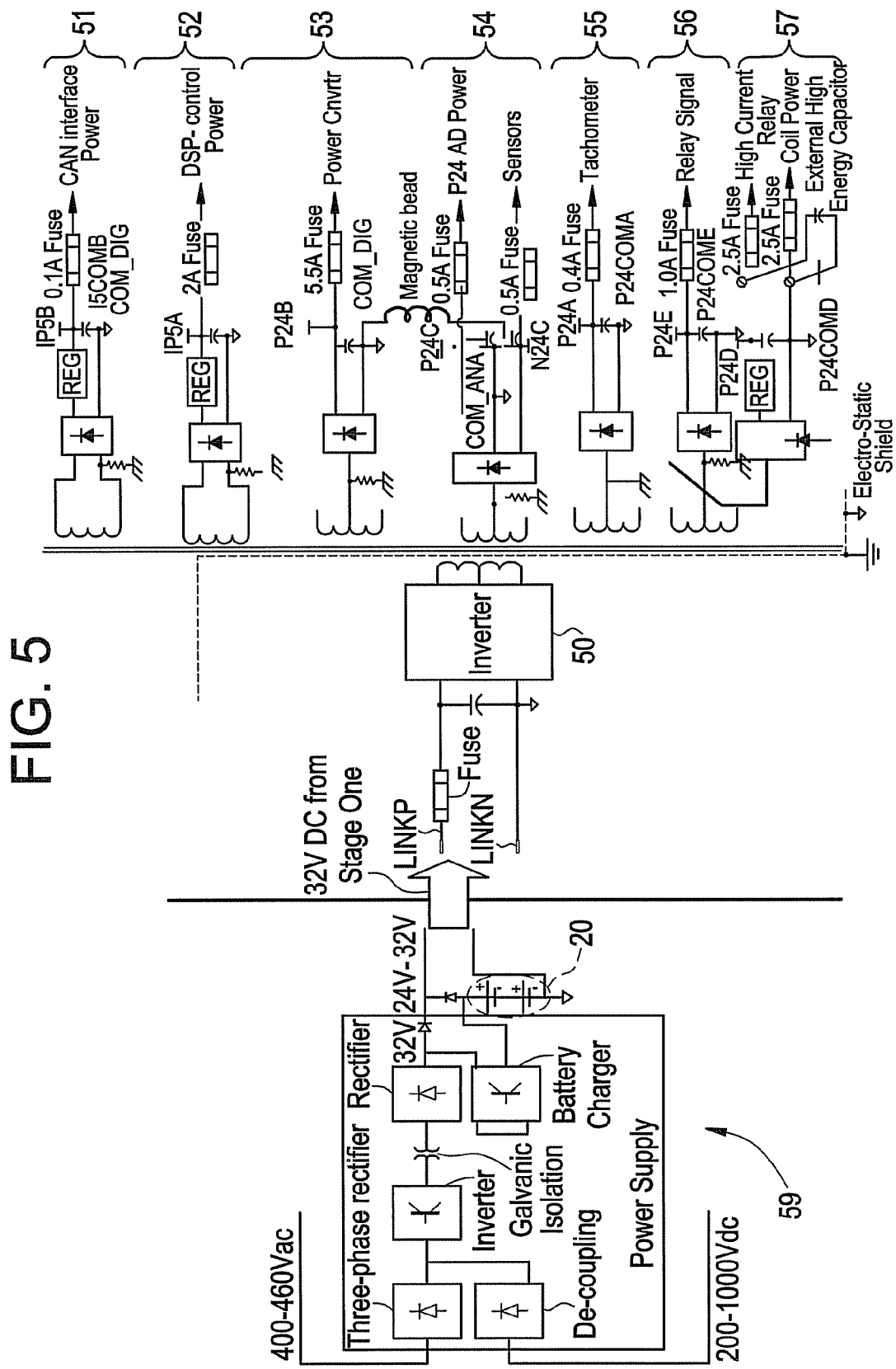
FIG. 5 depicts aspects for a critical control system power supply.

In FIG. 5, an exemplary embodiment for the power supply is depicted. In FIG. 5, various components make use of the main energy storage element 20 during black start. One skilled in the art will recognize that the scheme and the components provided are merely illustrative and not limiting of the teachings herein. Further, the main energy storage element 20 could provide energy to any one or more of the components in concert with or in place of the short-term storage element 21.

In the exemplary embodiment of FIG. 5, the control power storage element provides direct current (DC) power to an inverter 50. The inverter 50 produces an alternating current (AC) signal for powering of the various components used during at least one of black start and line-charging. For example, the inverter 50 provides an AC signal to a CAN interface 51, a digital signal processor control (DSP control) 52, a power converter (e.g., a power stack) 53, sensors (e.g., an AD power system) 54, a tachometer 55, a relay signal unit 56 and a high current relay 57.

Figure 6:
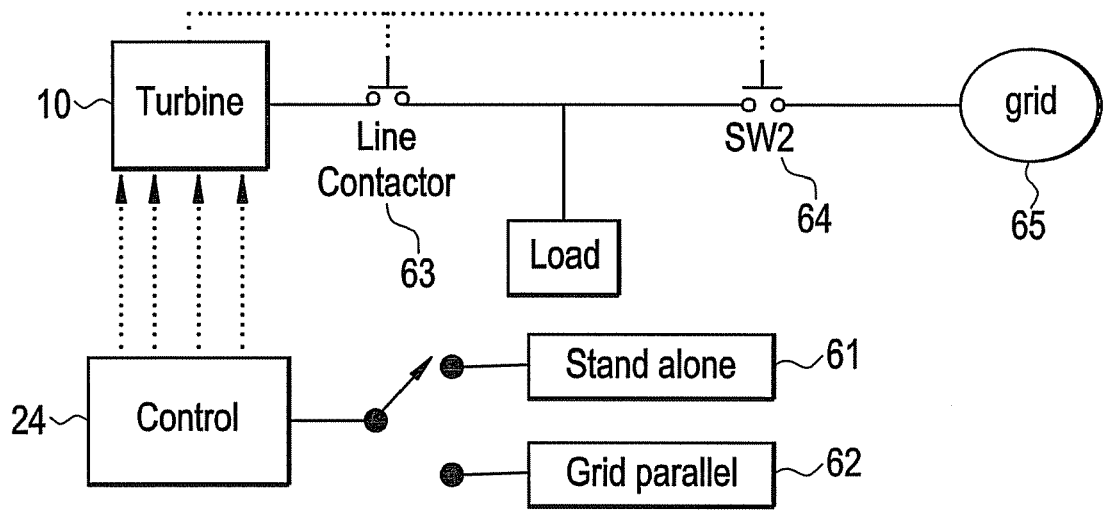
FIG. 6 depicts exemplary structures for switching between stand alone and grid interconnected operation.

As depicted in FIG. 6, the control system 24 provides for switching between a stand alone configuration 61 and a grid parallel configuration 62. The control system 24 makes use of a line contactor 63 and a main switch (SW2) 64 for coupling the turbine 10 to the grid 65. During the start-up, the turbine 10 is initially regulated in stand-alone mode. Excess power of the turbine 10 is fed to the internal load. Status for the grid 65 is detected at the outside point of the SW2 64 (between SW2 64 and the grid 65). If the grid 65 is healthy, the turbine 10 will proceed with synchronizing the regulated voltage output with a grid voltage in order to provide for feeding the grid 65.

Figure 7:
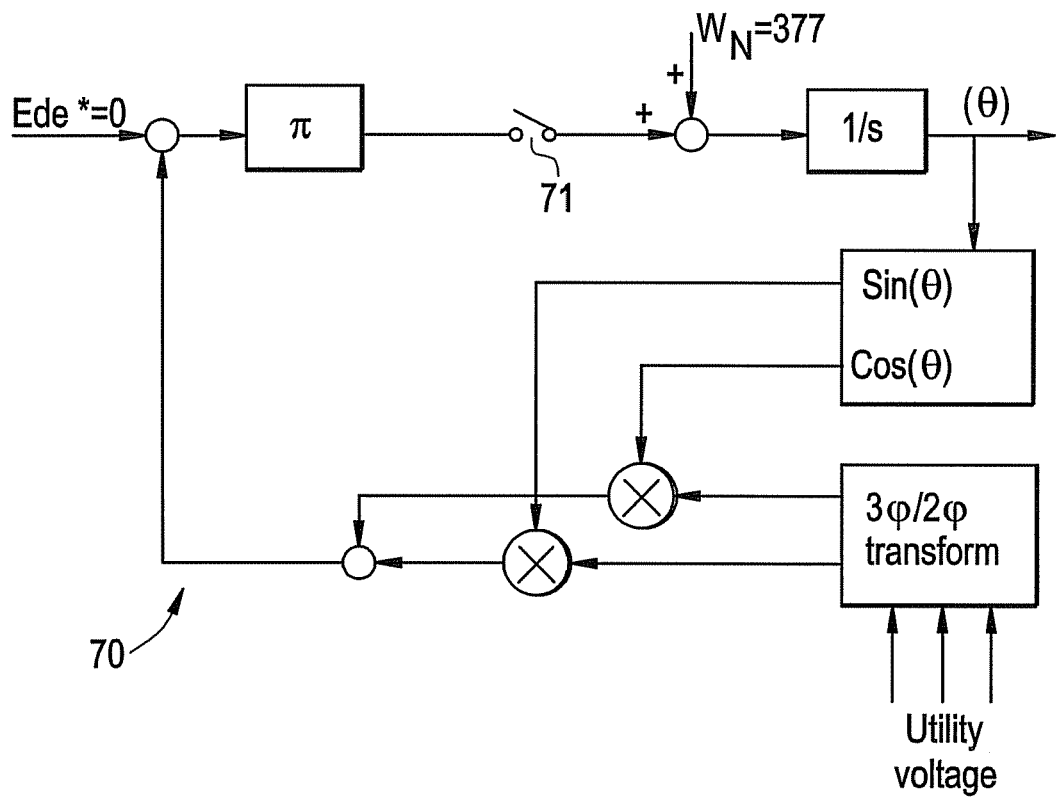
FIG. 7 depicts aspects of a phase-lock-loop (PLL) scheme for synchronizing with a grid signal.

FIG. 7 depicts aspects of logic for phase transformation to provide synchronization with the grid 65. In this exemplary embodiment, a phase-lock-loop (PLL) phase control circuit 70 is provided. During stand-alone mode, the synchronizing switch 71 in FIG. 7 is open. The phase command of voltage reference is an open-loop. During the synchronization period, the synchronizing switch 71 is closed, and the turbine voltage is regulated to follow the grid voltage. When the turbine voltage matches the grid voltage (in terms of amplitude and phase angle), SW2 64 (see FIG. 6) is closed.

Figure 8:
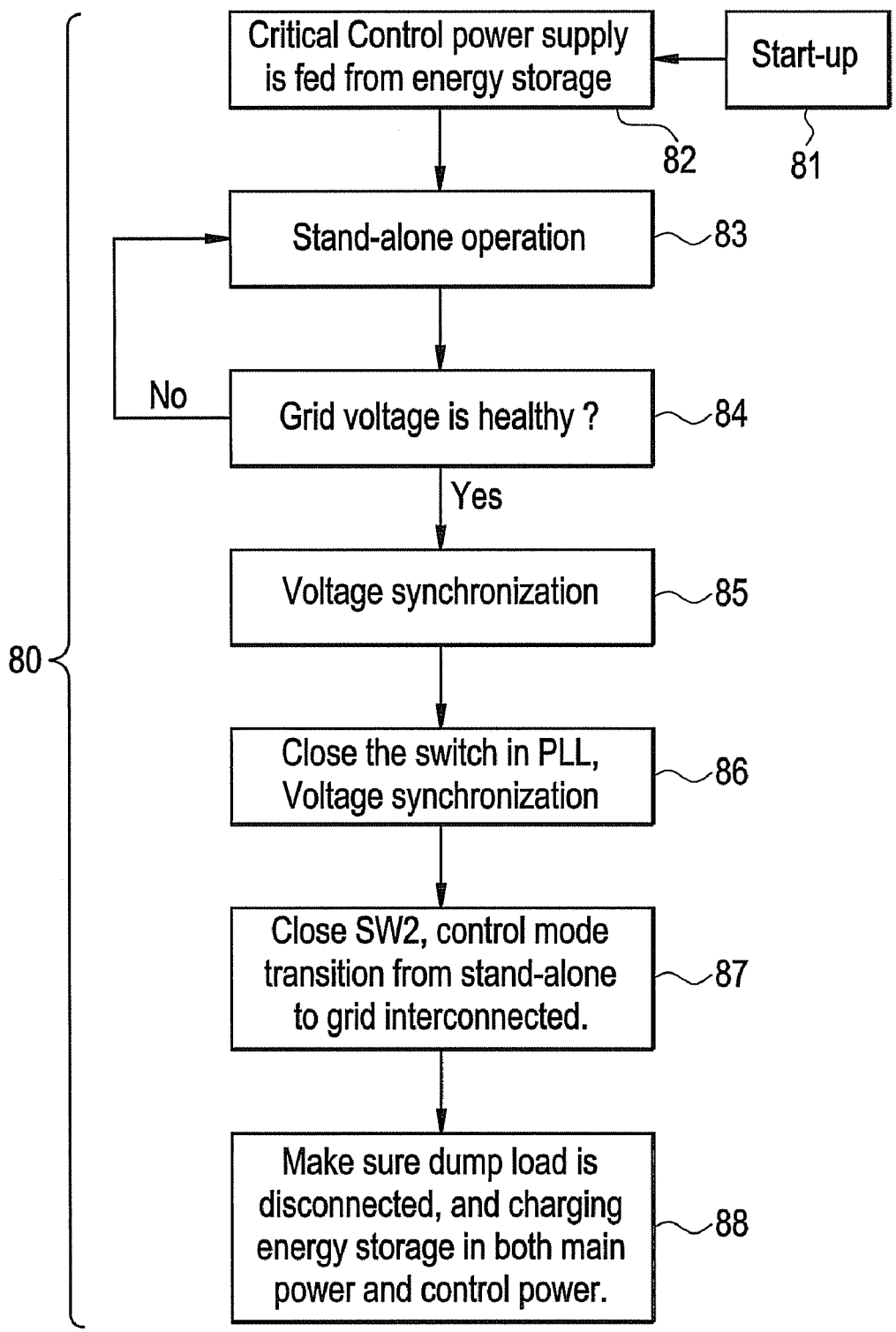
FIG. 8 is a flow chart depicting exemplary logic for switching between stand alone and parallel operation of the turbine.

FIG. 8 provides an exemplary logic for monitoring status of the turbine 10 and adjusting operation to account for grid conditions. In the embodiment of FIG. 8, the control system 24 executes configuration control 80 on a continuous basis. Configuration control 80 provides for periodic (essentially continuing) monitoring of operational state in a first step 81. The status monitoring includes monitoring the electric signal of the grid 65 as well as connection of the turbine 10 with the grid 65.

If the control system 24 ascertains that the grid 65 is not operational, when the control system 24 tests for island mode in a second step 82. If island mode is detected, then the control system 24 adjusts the phase output of the phase control circuit 70 in a third step 83, and proceeds to transfer control for stand alone operation in a fourth step 84. As a part of transferring control, the control system 24 opens the main switch 64 in a fifth step 85.

Restating aspects of the teachings herein in simpler terms, for embodiments involving typical operation, the turbine 10 powers the internal load using at least one of the energy storage elements and power from the generator 23. Excess power (beyond that required by the internal load) may be dissipated in the dissipative element 29. Once power generation in the wind turbine 10 is stabilized and the internal load is satisfied, the teachings herein provide for coupling the turbine output to the grid 65 and gradual increase of the output to the grid 65.

Various other scenarios may be realized. For example, when the turbine 10 is in the stand alone configuration, the main switch 64 is open, and the grid 65 may be operational. The control system 24 transfers turbine output to grid parallel operation by closing the main switch 64. In this embodiment, certain limitations may apply. For example, when the load voltage is nonlinear (e.g. diode rectifier or active rectifier) the load voltage will be greatly distorted. This solution is not feasible.

In another scenario, turbine 10 is in the stand alone configuration, the main switch 64 is open, and the grid 65 is operational. Synchronism is established between the turbine 10 and the grid 65. The control system 24 transfers turbine output to grid parallel operation by closing the main switch 64 and control is transferred to grid parallel mode. During the period between "closed sw2" and "control transfer", the current will be distorted. So in stand-alone control, a current limit is carefully controlled.

Figure 9:
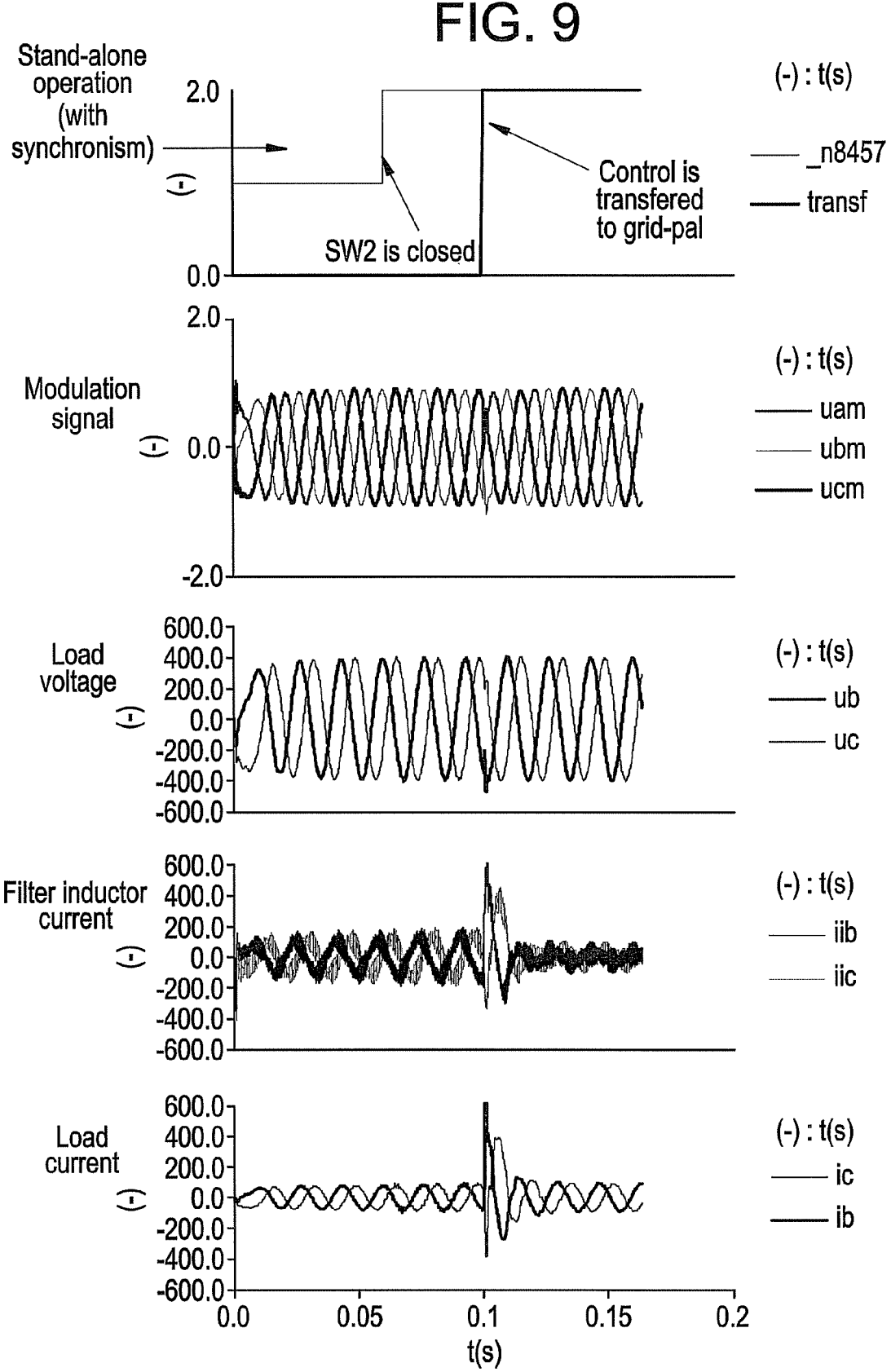
FIG. 9 depicts simulated signals for transition from a stand-alone mode to a grid pal mode.

In FIG. 9, simulation data is provided. In FIG. 9, transition from stand-alone mode to a grid connected mode is depicted. The simulated load is provided as a resistor.

Use of at least one energy storage element provides for the start-up of the turbine 10 when desired and under varying conditions. Black start makes use of various features, including a wide voltage range critical bus. Black start provides for connecting essential actuators, heaters, and control systems needed for the start-up process—a wind turbine control algorithm, controlling the turbine (pitch) such that a power balance is maintained between the wind captured and the intrinsic loads of the turbine. Advantageously, the presence of the dissipative element 29 and the short-term energy storage element 21 support power balance during wind fluctuations and load changes, providing for the ability to gradually change the output voltage and pre-charging of connections to the grid 65.

A technical effect of the teachings herein is that the control system 24 of the wind turbine 10 is provided with control over components of the wind turbine 10 for black start-up thereof. In various embodiments, the control is achieved through use of software running within the control system 24 that provides for monitoring and control over the various processes and components of the wind turbine 10, alone or in conjunction with operation of the grid 65.

Advantages of the apparatus and methods disclosed herein include an ability to start and maintain a wind turbine in operation without the presence of a grid (can also be used to recharge the energy storage element for long term outages); an ability to step up the loads at the grid without reflecting the load changes to the drive train; and an ability to bring an entire wind-farm into operation by installing one black-start enabled turbine in the cluster.

Certain salient aspects of the teachings include a wind turbine with integrated energy storage element allowing to start up the wind turbine irrespective of the presence of a grid; a variable voltage critical bus that connects all essential controllers, heaters, and actuators needed for a wind turbine start-up; presence of a control state "idle mode" in which a power balance between wind power captured and loads inside the wind turbine may be achieved (the control state "idle" can also be used to charge the energy storage element(s) such that long term outages can be covered without loss of control and communications); existence and use of a short-term energy storage element and a dissipative element to support power balancing specifically during fluctuating wind situations and enabling stepwise grid load aggregation; turbine control allowing for gradual increase in the grid output voltage and a device feeding power from the grid to the critical bus, operating at a wide grid voltage range.

Aspects of capabilities of the present invention can be implemented in software, firmware, hardware or some combination thereof. As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, aspects of the steps may be performed in a differing order, steps may be added, deleted and modified as desired. All of these variations are considered a part of the claimed invention.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A wind turbine comprising:
   an electric generation system for producing electricity by operation of the wind and comprising an interface for providing the electricity to an electric grid;
   a control system for controlling components of the wind turbine during start-up of the electric generation system, wherein start-up occurs during a deficient electric signal of the grid; and
   at least one energy providing element and at least one energy dissipative element for providing a balance between an output of the wind turbine and the electric signal of the grid during the start-up.

2. The wind turbine of claim 1, wherein the at least one energy providing element is coupled to a common bus of the electric generation system.

3. The wind turbine of claim 1, wherein the at least one energy providing element provides a start-up power supply to at least one of a CAN interface, a digital signal processor control (DSP control), a power converter, a sensor, a tachometer, a relay signal unit and a high current relay.

4. The wind turbine of claim 1, wherein the at least one energy providing element provides a start-up power supply for controlling at least one of yaw, pitch, braking and rotor heating of the wind turbine.

5. The wind turbine of claim 1, wherein the at least one energy providing element provides a start-up power supply for controlling at least one of a controller, a heater and an actuator of the wind turbine.

6. The wind turbine of claim 1, wherein the energy providing unit comprises one of a battery, a capacitor and a generator.

7. A method for start-up of an electrical generation system of a wind turbine, the method comprising:
   monitoring a signal of an electrical grid, the grid for distribution of an electric output signal from the generation system, and
   starting the electrical generation system by at least one of supplying power to components of the wind turbine and dissipating power from the grid by controlling at least one of a start-up power supply of the turbine and an energy dissipative element of the turbine.

8. The method as in claim 7, wherein further comprising providing power from the generation system in one of a stand alone mode and a grid connected mode.

9. The method as in claim 7, wherein controlling comprises synchronizing the output signal from the generation system with the signal of the grid.

10. The method of claim 9, wherein synchronizing comprises at least one of synchronizing a phase and a voltage.

11. The method of claim 7, wherein starting comprises gradual charging of a connection of the wind turbine to the grid.

12. The method of claim 7, further comprising gradually increasing the output signal provided to the grid.

13. The method of claim 7, wherein dissipating power comprises at least one of charging the start-up power supply and providing the power to a dissipative element of the wind turbine.

14. The method of claim 7, wherein controlling comprises controlling at least one of yaw, pitch, braking and rotor heating of the wind turbine.

15. The method of claim 7, further comprising charging the start-up power supply during a period of operation of the wind turbine.

16. A computer program product stored on machine readable media comprising instructions for start-up of an electrical generation system of a wind turbine, the instructions for:
   monitoring a signal of an electrical grid, the grid for distribution of an electric output signal from the generation system, and
   starting the electrical generation system by at least one of supplying power to components of the wind turbine and dissipating power from the grid by controlling at least one of a start-up power supply of the turbine and an energy dissipative element of the turbine.

17. The computer program product of claim 16, further comprising instructions for switching between stand-alone operation and a grid connected operation of the wind turbine.

18. The computer program product of claim 16, further comprising instructions for gradually increasing the output signal at a predetermined rate.

19. The computer program product of claim 16, further comprising instructions for providing a user interface.

* * * * *